United States Patent [19]

Münch

[11] Patent Number: 4,496,298

[45] Date of Patent: Jan. 29, 1985

[54] DIE PLATE FOR GRANULATION PRESSING, PARTICULARLY FOR THE MANUFACTURE OF FEED GRANULES

[76] Inventor: Peter Münch, In der Beek 126 b, 5600 Wuppertal 1, Fed. Rep. of Germany

[21] Appl. No.: 395,901

[22] Filed: Jul. 7, 1982

[30] Foreign Application Priority Data

Jul. 11, 1981 [DE] Fed. Rep. of Germany ....... 3127506

[51] Int. Cl.[3] .............................................. B29F 3/012

[52] U.S. Cl. ................................ 425/192 R; 425/331; 425/382 R; 425/461; 425/463; 425/DIG. 101

[58] Field of Search ............... 425/192 R, 382 R, 461, 425/463, 464, 331, 183, DIG. 59, DIG. 101

[56] References Cited

U.S. PATENT DOCUMENTS

| | | | |
|---|---|---|---|
| 2,087,512 | 7/1937 | Hall | 425/192 R |
| 3,167,033 | 1/1965 | Kuhn | 425/192 R |
| 3,199,146 | 8/1965 | Fisher | 425/192 R |
| 3,366,078 | 1/1968 | Crane | 425/192 R |
| 3,599,285 | 8/1971 | Hamilton | 425/464 |
| 3,679,343 | 7/1972 | Gilman | 425/331 |
| 4,167,386 | 9/1979 | Mallay | 425/463 |
| 4,179,257 | 12/1979 | Heesen | 425/331 |

FOREIGN PATENT DOCUMENTS

| | | | |
|---|---|---|---|
| 730059 | 3/1966 | Canada | 425/192 R |
| 992352 | 5/1965 | United Kingdom | 425/464 |

*Primary Examiner*—Jeffery Thurlow

*Attorney, Agent, or Firm*—Wigman & Cohen

[57] ABSTRACT

Die for granulation presses, particularly for the manufacture of feed granulates, consisting of a cylindrical, cross-sectionally circular center element (1) having a plurality of granulating bores and connecting flanges (2,3) formed on the two ends of the center element, whereby the center element (1) and the connecting flanges (2,3) consist of separate elements. The center element (1) is made of wear-resistant steel and the flanges (2,3) are made of a highly durable steel. The connecting flanges (2,3) are heat shrunk onto the ends of the center element (1).

11 Claims, 2 Drawing Figures

DIE PLATE FOR GRANULATION PRESSING, PARTICULARLY FOR THE MANUFACTURE OF FEED GRANULES

BACKGROUND OF THE INVENTION

The present invention relates to a die for granulation presses, particularly for the manufacture of feed granulates, consisting of a cylindrical, cross-sectionally circular center element having a plurality of granulation bores and connecting flanges formed on the two ends of the center element.

The known granulation presses consist of a die like that described above, in which two compression rollers, so-called crushing rollers, are mounted in an eccentrically rotatable manner, whereby the die rotates about the compression rollers at a speed of approx. 200 to 300 rotations per minute. One side of the die is clamped to the drive element by means of the connecting flange and on the other side a cover is placed on the flange. The pressure arising from the compression of the products between the rollers and the center element, which may rise as high as 200 tons maximum, the die is subject to a high, constant load. In order to assure a high wear resistance of the center element of the die, the entire die is made of hardened chrome steel, whereby in the working area of the center element there may be as many as approx. 3000 to 18,000 granulating bores of a diameter of from 2 to 20 mm. Because of the continuous load, the known dies of hardened chrome steel experience fatigue breaks after anywhere from 200 to 600 hours of operation. Because of this large range for the appearance of the breaks, it is not possible to predict the useful life, so that a continuous danger of injury and destruction is present for the operating personnel and for the machinery due to the material sent flying by a break, often weighing as much as 100 kg.

SUMMARY AND OBJECTS OF THE INVENTION

The present invention has the object of avoiding the above disadvantages and creating a die which is distinguished by a long useful life with significantly lower danger of breaks.

According to the invention, this is achieved by the fact that the center element and the connecting flanges are comprised of separate parts, whereby the center element is made of a wear-resistant steel and the flanges are made of a steel with high durability.

Accordingly, the invention lies in the recognition of the fact that a break hinderance is produced practically between the individual die elements because of the three-part manufacture of the die, since a break which occurs in, for example, one of the parts cannot automatically continue into the other element, but is stopped at the transition point to the other element. By this means a significant reduction of the danger of a complete destruction and the associated danger of accident is achieved. This effect is also accentuated by the combination of materials according to the invention, for by manufacturing the flanges of a very durable, unhardened steel, they are more easily able to assume the fulling loads that occur, causing an elliptical deformation, than the previously used, relatively brittle, hardened material of the center element. However, at the same time the die according to the invention makes use of the advantages of this material with regard to its high wear resistance, because the center element is still made of this material.

In addition, the embodiment according to the invention also results in the advantage that a significant savings of material is achieved. For in the known dies the center element was manufactured in a bridging arrangement from the full material, having the same thickness as the flange, thus causing a substantial material waste of the relatively expensive chrome steel. By forming the die in three parts according to the invention, this material waste no longer occurs, because the center element can now be made directly from material having suitable wall thickness.

By means of the embodiment of a die according to the invention, the danger of rupture is substantially reduced, particularly in the center element, which is especially susceptible to breaks due to the holes therein, because the forces that appear can primarily be assumed by the flanges, which are made from elastic material. This results not only in a significant contribution with regard to accident reduction in the workplace by means of the invention, but in addition, an increase in machine operation time and resultant reduction in down time is achieved, leading overall to a significant cost savings.

Advantageous embodiments of the invention are contained in the dependent claims 2 through 7.

BRIEF DESCRIPTION OF THE DRAWINGS

The invention is described in greater detail with the aid of the exemplary embodiment illustrated in the attached drawings. Shown are.

DETAILED DESCRIPTION OF A PREFERRED EMBODIMENT

Figure 1:
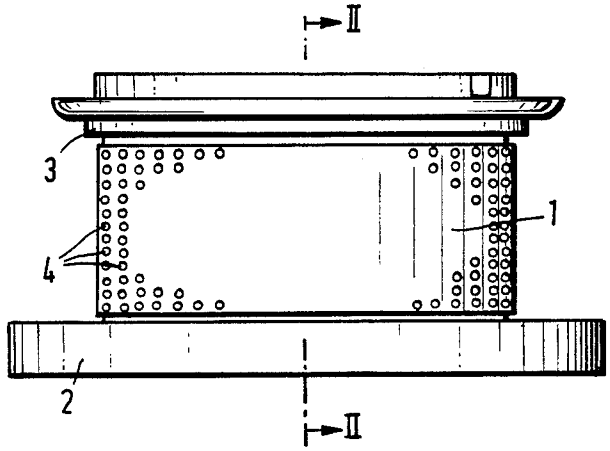
FIG. 1 is a perspective view of a die according to the invention

As shown in FIG. 1, a die according to the invention consists of a center element 1, which is formed as a cylinder and has a circular cross section. Respective connecting flanges 2, 3 are arranged on the two ends of the center element 1. The upper connecting flange 3 serves to connect the die to the drive portion of a granulation press (not shown). In the as-used condition a cover is attached to the lower connecting flange 2, which cover is also not shown. A plurality of granulation bores 4 are formed in the center element 1, which run through the wall of the center element 1 and are formed in a known manner. The center element 1 preferrably consists of a material having a high wear resistance, particularly of a hardened chrome steel. The wall thickness of the center element is about 35 to 70 mm. The two connecting flanges 2,3 preferrably consist of a durable, unhardened material; suitable in this regard are unalloyed construction steels having low strength, particularly an St-37 steel.

Figure 2:
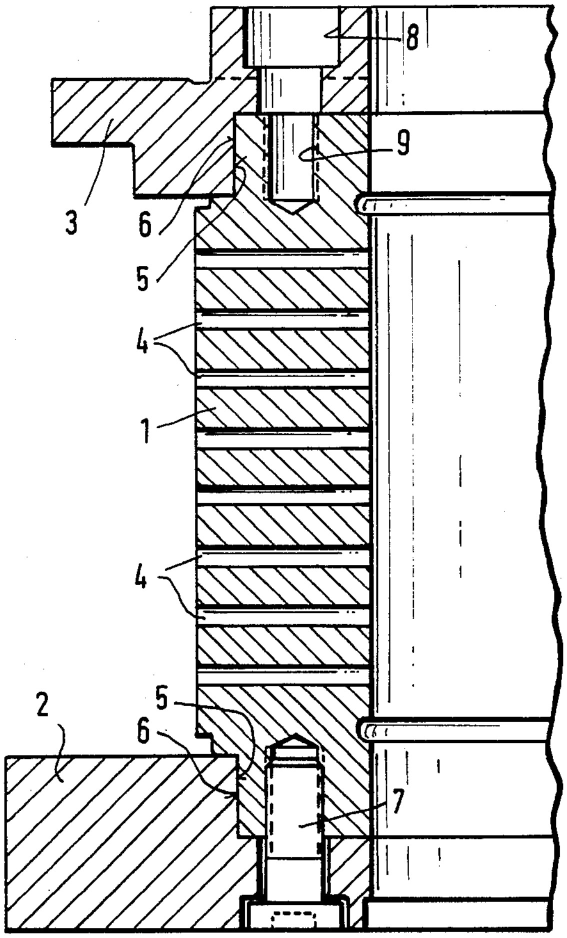
FIG. 2 is a section along the secition line II—II in FIG. 1.

As shown in FIG. 2, the two connecting flanges 2,3 are heat shrunk onto the ends of the center element. For this purpose the ends of the center element are provided with respective shoulders 5 which include peripheral, cylindrical contraction surfaces. The contraction occurs as heat shrinking. The two connecting flanges 2,3 each have a cylindrical recess 6 adapted to the shoulder 5 of the center element, whereby, however, the inner diameter of the recess 6 is manufactured slightly undersized by about 3 to 5/10 mm, in order to permit press seating on the center element after the heat shrinking.

Because of the contraction of the connecting flanges, these flanges exert a shrinkage tension on the center element 1 which compensates for the tensions arising in the material of the center element because of the mechanical loading and the heat tensions that occur. This results, surprisingly, in the additional effect that the center element can be made of a harder and therefore more brittle material than the center elements of the dies of the prior art, so that an additional increase in the useful life of the die according to the invention is achieved thereby, since there is less wear of the center element. Furthermore, the connection of the connecting flanges by contraction makes it possible to remove the connecting flanges by heating them accordingly. This is particularly advantageous, because it makes it possible to be able to reuse the connecting flanges, which as a rule are subject to only small degrees of wear, in combination with a new center element or with a center element which has been rotated by 180 degrees. This results in a not insubstantial cost savings.

Furthermore, as shown in FIG. 2, the connecting flanges 2,3 are also secured to the side elements by means of threaded bolts 7. These threaded bolts 7 run in the axial direction of the center element 1 and are evenly distributed about the periphery of the flanges. Preferably, six to twelve such threaded bolts are employed. The flanges and the center element each have full length bores 8 or threaded holes 9 to permit the threaded bolts 7 to be screwed in. The threaded bolts 7 advantageously consist of a durable material having a high elasticity, so that they can support the impact loads that occur without danger of breakage.

As shown in FIG. 2, the connecting flanges 2,3 are formed with different sizes of outside diameters. This is also a significant advantage of the invention, namely, that it is possible to produce more stable flanges than were produced in the dies of the prior art, without significant additional expense due to material costs, in order to keep the material waste as low as possible.

I claim:

1. Die for granulation presses, particularly for the manufacture of feed granulates, comprising:

a one-piece cylindrical, cross-sectionally circular center element consisting of wear-resistant steel having a plurality of granulating openings, a drive flange arranged on one axial end of the center element for connecting the center element to a drive element of the granulation press; and a connecting flange arranged on the other axial end of the center element, said connecting flange having a greater outside diameter and radial strength than said drive flange;

means for rigidly fixing said drive flange and said connecting flange to said center element;

wherein the connecting flange and drive flange are formed and used as mounting flanges for holding the center element and are made of a high durability steel.

2. Die according to claim 1, wherein the flanges are heat shrunk onto the ends of the center element.

3. Die according to claim 2, wherein the flanges are secured to the center element at the periphery thereof by means of threaded bolts running in the direction of the longitudinal axis of the die.

4. Die according to claim 3, wherein the fixing means are bolts made of a high durability steel.

5. Die according to claim 2, wherein the ends of the center element and the end rings are cylindrical and the inner diameter of the end rings is undersized by 3/10 to 5/10 mm.

6. Die according to claim 1, wherein the center element has a wall thickness between 35 to 70 mm.

7. A die for granulation presses, particularly for the manufacture of feed granulates, comprising:

a one-piece cylindrical, cross-sectionally circular center element consisting of wear-resistant steel having a plurality of granulating openings;

a drive flange and a connecting flange arranged on opposite axial ends of the center element, said flanges being formed and used as mounting flanges for holding the die and are made of a high-durability steel, said connecting flange having a greater outside diameter than said drive flange; and means for rigidly fixing said flanges to said center element.

8. Die according to claim 7, wherein the flanges are heat shrunk onto the ends of the center element.

9. Die according to claim 8, wherein the flanges are secured to the center element at the periphery thereof by means of threaded bolts running in the direction of the longitudinal axis of the die.

10. Die according to claim 7, wherein the center element has a wall thickness between 35 to 70 mm.

11. Die according to claim 7, wherein said center element consists of one unitary piece of steel.

* * * * *